United States Patent [19]
Peters

[11] Patent Number: 5,524,508
[45] Date of Patent: Jun. 11, 1996

[54] ADAPTER FOR COUPLING AN ENGINE AND TRANSMISSION

[76] Inventor: Don Peters, 3721 W. 172nd St., Torrance, Calif. 90504

[21] Appl. No.: 308,744

[22] Filed: Sep. 19, 1994

[51] Int. Cl.⁶ .................................................. F16H 57/02
[52] U.S. Cl. .................................................. 74/606 R
[58] Field of Search .................................. 74/606 R, 572

[56] References Cited

U.S. PATENT DOCUMENTS

| | | | |
|---|---|---|---|
| 2,593,020 | 4/1952 | Glover | 74/606 R |
| 3,772,938 | 11/1973 | Johnson | 74/606 R |
| 4,478,593 | 10/1984 | Brown | 464/182 |
| 4,502,279 | 3/1985 | Fuehrer | 74/606 R X |
| 5,203,441 | 4/1993 | Monette | 74/606 R X |

OTHER PUBLICATIONS

J. C. Whitney & Co., Catalog No. 294, 1971, p. 57.

*Primary Examiner*—Rodney H. Bonck
*Assistant Examiner*—Mary Ann Battista
*Attorney, Agent, or Firm*—J. E. Brunton

[57] ABSTRACT

An adapter unit for coupling a particular engine with an unrelated transmission, which includes a hollow housing cast as a single piece having a chamber within which a flywheel can be received and to which a removable segment can be connected after the flywheel has been inserted into the chamber. The removable segment is provided with an arcuate opening so that, after it has been reconnected with the housing, convenient access can be had to the converter bolts of the transmission so that the bolts can readily be connected to a connector plate having the proper hole spacing.

7 Claims, 6 Drawing Sheets

ADAPTER FOR COUPLING AN ENGINE AND TRANSMISSION

BACKGROUND OF THE INVENTION

1. Field of the Invention

The present invention relates generally to automotive components. More particularly, the invention concerns a novel automotive adapter unit for coupling an engine with an unrelated transmission.

2. Discussion of the Invention

On occasion it is necessary to place into a certain vehicle an engine that cannot be directly coupled with the transmission contained within that vehicle. For example, frequently it is desirable to place a diesel engine into a truck or other vehicle that is equipped with a transmission to which the diesel engine cannot be directly coupled. When this is to be done, either the transmission must be removed and replaced with a transmission that is compatible with the diesel engine or, alternatively, some type of adapter must be used to appropriately couple the engine with the existing transmission.

Adapters for coupling dissimilar engines and transmissions are not new and several different types of adapters have been suggested in the past. Typically, these adapters comprise two or more separate rings which must be bolted to the engine and transmission and then bolted together to form the coupling. This can be extremely difficult because of the confined space between the engine and the transmission. Further, proper alignment of the two rings of the adapter is often difficult and typically special guide pins must be provided to ensure proper indexing of the ring elements.

Another significant disadvantage of many prior art adapters is that generally the transmission casing must be cut in order to gain access to the converter bolts of the transmission so that the converter bolts can be connected to a specially designed connector plate. As will become apparent from the discussion which follows, the novel adapter unit of the present invention uniquely overcomes this drawback of many prior art devices.

U.S. Pat. No. 4,478,593 issued to Brown is exemplary of prior art coupling devices. The Brown device utilizes a connector plate disposed between a powered flywheel related to the engine and a transmission flywheel related to the transmission. In the Brown device, an annular disc is used to connect a housing of the flywheel to a housing of the transmission assembly.

Additional patents having general relevance to the present invention are cited in the Brown patent. As will be better appreciated from the discussion which follows, the adapter unit of the present invention is clearly different from the devices disclosed in these patents as well as from the Brown device disclosed in U.S. Pat. No. 4,478,593.

SUMMARY OF THE INVENTION

By way of brief summary, one form of the adapter assembly of the present invention comprises a hollow housing within which a flywheel can be received and a removable segment that can be connected to the hollow housing after the flywheel has been inserted within a chamber defined by the walls of the hollow housing. The removable segment is provided with an arcuate opening so that, after it has been reconnected with the housing, access can be had to the converter bolts of the transmission so that the bolts can readily be connected to a connector plate having the proper hole spacing.

In another form of the invention, the adapter assembly includes a hollow housing, a removable segment that can be connected to the hollow housing and a custom designed flywheel. This form of the invention is used when the engine flywheel is of a configuration that is unsuitable for use with the hollow housing.

Another object of the invention is to provide an adapter unit of the aforementioned character in which the housing is cast as a single integral component having an internal chamber within which the flywheel of the engine can be conveniently received.

Another object of the invention is to provide an adapter unit of the character described in the preceding paragraph in which the lower wall of the removable segment which id connectable with the single piece housing is provided with an opening of a size to permit the mechanic to attain the necessary access to the internal chamber of the adapter assembly to interconnect the torque converter with the connector plate.

Another object of the invention is to provide an adapter unit of the class described which is easy to use, is light weight, requires no special tools and is durable and reliable in use.

DESCRIPTION OF THE INVENTION

Figure 1:
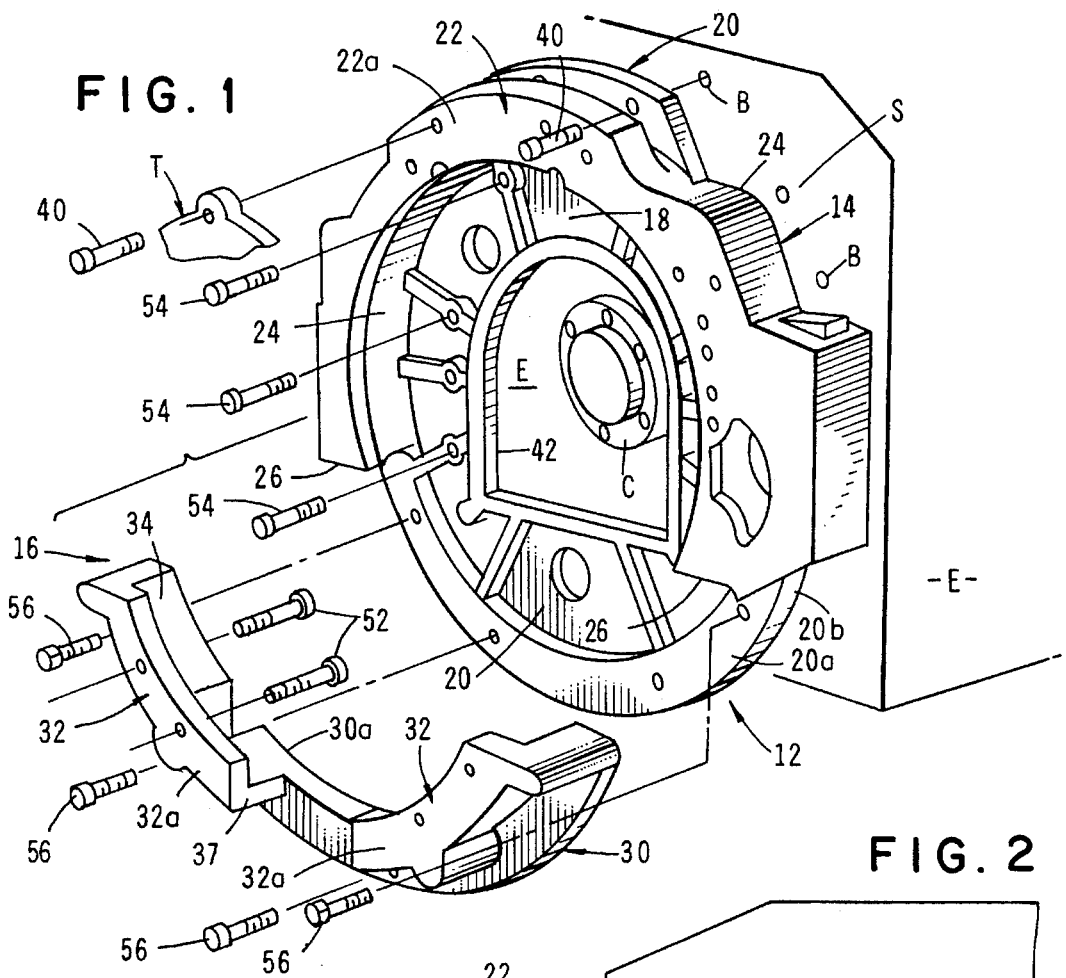
FIG. 1 is a generally perspective view of one form of the adapter assembly of the present invention.
Figure 2:
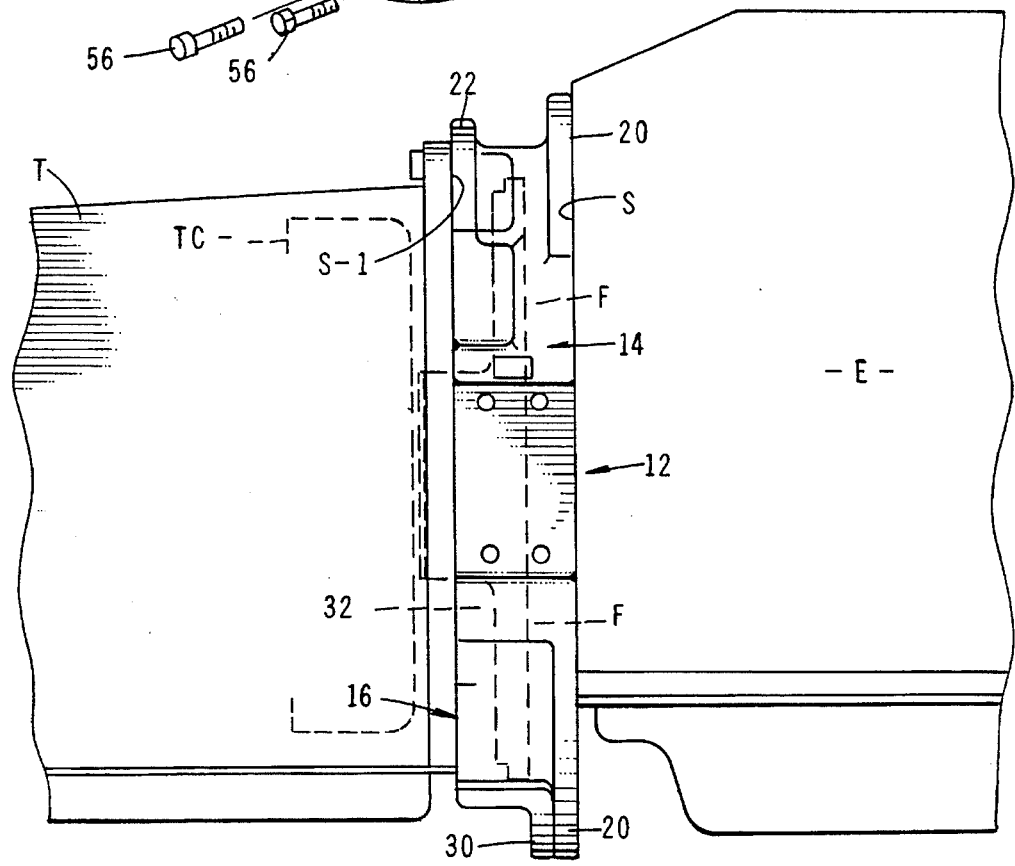
FIG. 2 is a side-elevational view showing the adapter assembly interconnected with an engine and an unrelated transmission.

Referring to the drawings and particularly to FIGS. 1 through 4, one form of the the adapter assembly of the present invention is shown. This embodiment is used to connect an engine "E", having a flywheel "F" to an unrelated automatic or standard transmission "T". As best seen by referring to FIG. 4, engine "E" also includes a crankshaft "C" to which the flywheel "F" connected. Engine "E" further also includes with a flat engaging surface "S" which is provided with a plurality of circumferentially spaced, threaded bores "B". Transmission "T" includes a housing "H" within which is housed a torque converter TC of conventional design. Transmission housing "H" is provided with an engaging surface "S-1" also having a plurality of circumferentially spaced apertures "O".

Figures 3, 4:
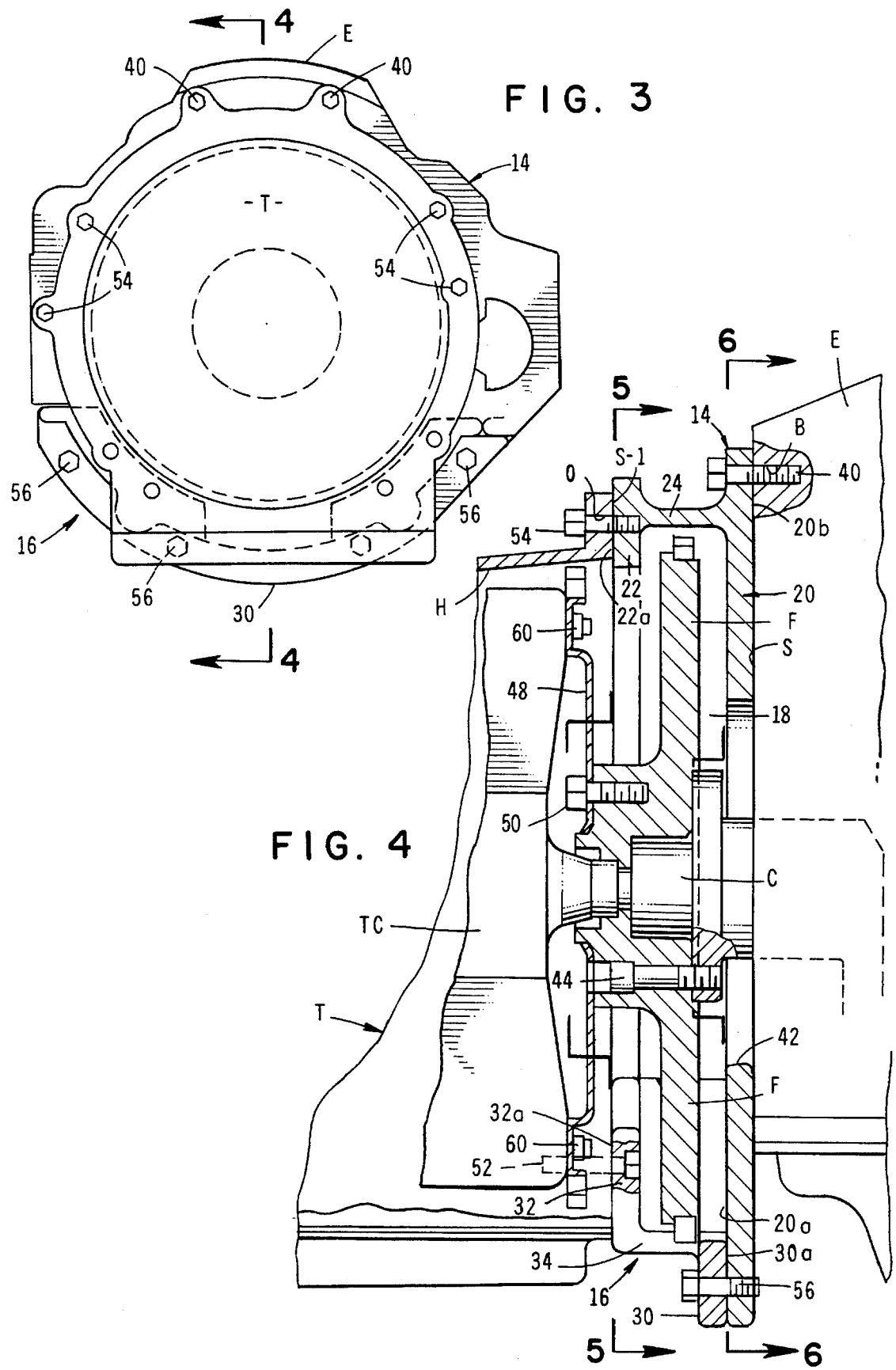
FIG. 3 is a side-elevational view looking from the left side of FIG. 2.
FIG. 4 is a greatly enlarged cross-sectional view taken along lines 4—4 of FIG. 3.
Figure 5:
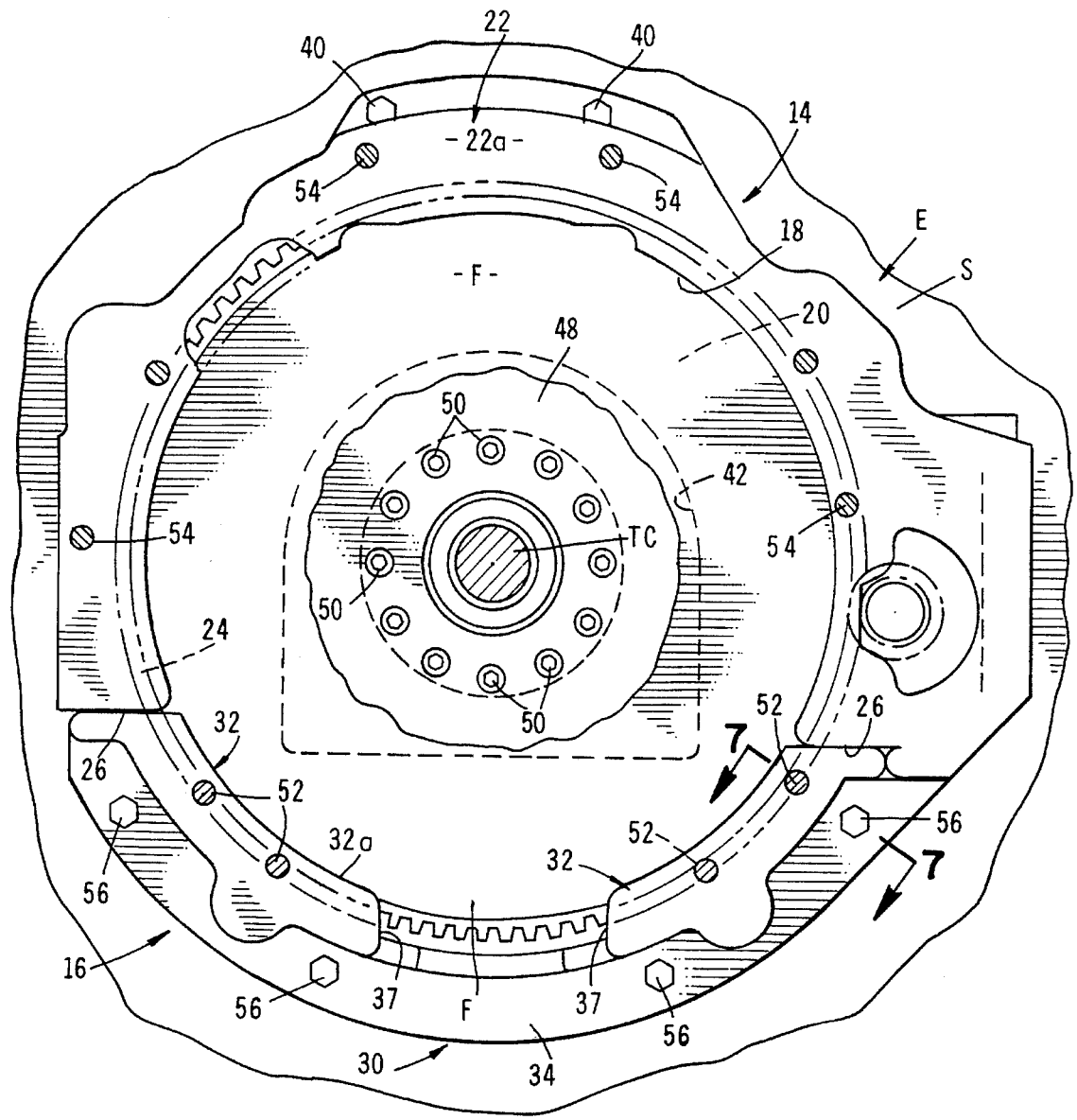
FIG. 5 is a cross-sectional view taken along lines 5—5 of FIG. 4.

Referring once again to FIG. 1, the adapter assembly of the present form of the invention, which is generally designated by the numeral 12, comprises an integral one-piece, cast body 14 and a cover means, or cover member 16, which is connected to body 14 in a manner presently to be described. Referring also to FIG. 4, it can be seen that the body 14 includes an internal chamber 18 which is defined by first and second walls 20 and 22 respectively that are interconnected by a peripheral side wall 24. Wall 24 is provided with an arcuate-shaped opening 26 which is partially closed by cover member 16 when the cover member is interconnected with body 14 in the manner shown in FIG. 5. Opening 26 is of a size and configuration that permits insertion of the flywheel "F" of the engine "E" into chamber 18 of the integral body 14 in the manner shown in FIGS. 4 and 5. Chamber 18 is also of a size and configuration that will accept, without modification, the flywheel "F" of the engine. As indicated in FIG. 5, after the flywheel of the engine has been positioned within chamber 18, cover member 16 can be bolted to body 14 so as to partially close internal chamber 18.

First wall 20 of body 14 has an inner surface 20a (FIG. 1) and an outer surface 20b (FIG. 4) which is interconnectable with surface "S" of engine "E". Similarly, second wall 22 has an engaging surface 22a which is engagable with surface S-1 of the transmission housing "H" (FIG. 4).

Figure 7:
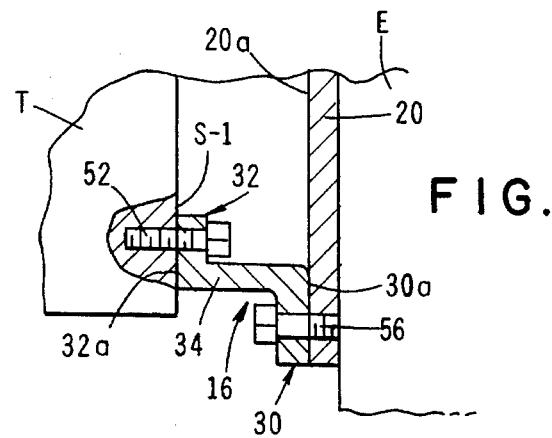
FIG. 7 is a cross-sectional view taken along lines 7—7 of FIG. 5.
Figure 6:
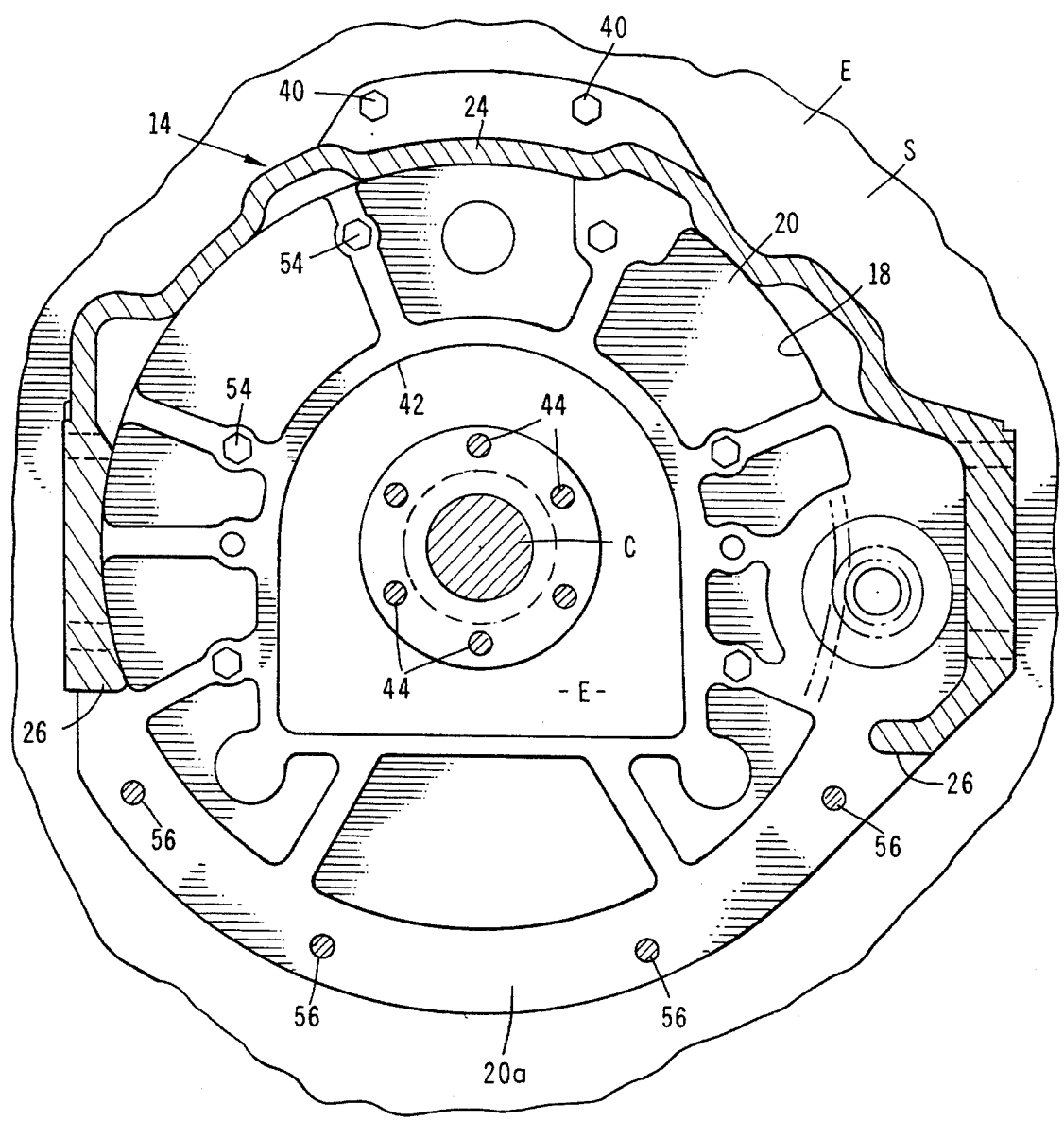
FIG. 6 is a cross-sectional view taken along lines 6—6 of FIG. 4.

Turning particularly to FIGS. 1, 4, and 7, it is to be noted that cover member 16 is generally Z-shaped in cross section and includes first and second walls 30 and 32 which are interconnected by a curved wall 34. First wall 30 is provided with an innerengaging surface 30a which is adapted to engage inner surface 20a of wall 20 of integral body 14. Similarly, second wall 32 has an engaging surface 32a which is adapted to engage surface S-1 of the transmission housing "H".

An important feature of the adapter of the present invention resides in the unique configuration of cover member 16. More particularly, as best seen in FIG. 1, curved wall 34 of this member is provided with an arcuate-shaped opening 37 which permits access to internal chamber 18 of the adapter assembly. The purpose of opening 37 and its importance in the actual use of the adapter assembly will be discussed in greater detail in the paragraphs which follow.

In using the adapter assembly of the present invention, cover member 16 is first disconnected from member 14. This done, member 14 is bolted to the engine using bolts 40 which are threadably receivable within threaded bores "B" provided in surface "S" of the engine housing. With respect to this interconnection step, it is to be noted that wall 20 of part 14 is provided with a generally U-shaped opening 42 through which the engine crankshaft can be received as member 14 is mounted with the engine.

After plate 14 has been bolted to the engine housing, the flywheel "F" can be inserted into chamber 18 through opening 26 and appropriately interconnected with the crankshaft using bolts 44 (FIG. 4). After a suitable connector plate, such as flexible connector plate 48, has been connected to flywheel "F" using bolts 50, the process of interconnecting the adapter assembly with the transmission housing can be commenced.

The first step in the process of connecting the adapter assembly to the transmission, preferably comprises interhousing connecting cover member 16 of the adapter assembly with the transmission housing. This is accomplished by placing surface 32a of wall 32 of the cover member in engagement with surface S-1 of the transmission housing and interconnecting the cover member to the transmission housing using a plurality of bolts 52 (FIG. 4). This done, the transmission, along with cover member 16 can be moved into mating engagement with body 14. In this mating operation, surface S-1 of the transmission housing is moved into engagement with surface 22a of member 14 in the manner shown in FIG. 4. As surface S-1 mates with surface 22a, surface 30a of wall 30 of the cover member 16 will move into engagement with inner surface 20a of wall 20 of member 14 in the manner shown in FIG. 4. With these surfaces in mating engagement, bolts 54 are used to connect the transmission housing with wall 22 of member 14 and bolts 56 are used to connect wall 30 of cover member 16 with wall 20 of body 14.

Following interconnection of the adapter assembly with the engine and transmission in the manner described in the preceding paragraphs, an elegant feature of the adapter of the present invention resides in the ability to use curved opening 37 to gain convenient access to connector bolts 60 which are used to interconnect connector plate 48 with the torque converter in the manner shown in FIG. 4. This novel feature of the apparatus of the invention eliminates the necessity of the time consuming and undesirable step of cutting an opening in the transmission housing as is required when using many of the previously discussed prior art units.

It is to be appreciated that in the construction of the adapter assembly of the invention, the hole pattern of the holes drilled in wall 20 of member 14 must index with the pattern of the threaded bores "B" provided in the engine housing. Similarly, the hole pattern of the holes in wall 22 must index with the bolt hole pattern of surface S-1 of the transmission housing which is to be interconnected with the engine "E". Similarly, connector plate 48 must also be provided with a hole pattern compatible with the hole patterns on the torque converter TC and on the flywheel "F" to enable the final interconnection of the flywheel to the torque converter in the manner discussed in the preceeding paragraph.

By way of an example, and without in any way limiting the scope of the present invention, the adapter assembly of the present invention can be expeditiously used to replace a gasoline powered engine with a diesel engine and then to directly couple the diesel engine with the transmission used with the gasoline powered engine. More particularly, using one form of the present invention, a diesel engine such as a Perkins engine can be mounted in a Ford truck having a gasoline engine and a Ford transmission. For this purpose, wall 20 of member 14 would be provided with a hole pattern comprising fourteen bores including two dowel holes having a diameter of on the order of 0.500 inch (in.), two clearance holes having a diameter of approximately 0.500 in., six clearance holes having a diameter of $13/32$ in., and four $3/8$-16 threaded holes. Similarly, wall 22 of member 14 would be provided with a hole pattern comprising eight holes, including two dowel holes of approximately 0.005 in. in diameter and six $7/164$-14 threaded holes. Additionally, in using the adapter assembly of the invention to interconnect a Perkins diesel engine with a Ford gasoline engine compatibletransmission, wall 30 of cover member 16 would be provided with $3/8$-16 holes while wall 32 would be provided with $11/32$ in. through holes and one $13/32$ in. through hole.

To interconnect torque converter TC with the flywheel, connector plate 48 would be used. Plate 48 is of a conventional construction and readily commercially available from a number of sources of automotive parts. It is to be understood that the size of the dowel holes, as well as the holes in the cover member and wall 32, can vary in size depending upon the model of engine and transmission being mated.

Figure 8:
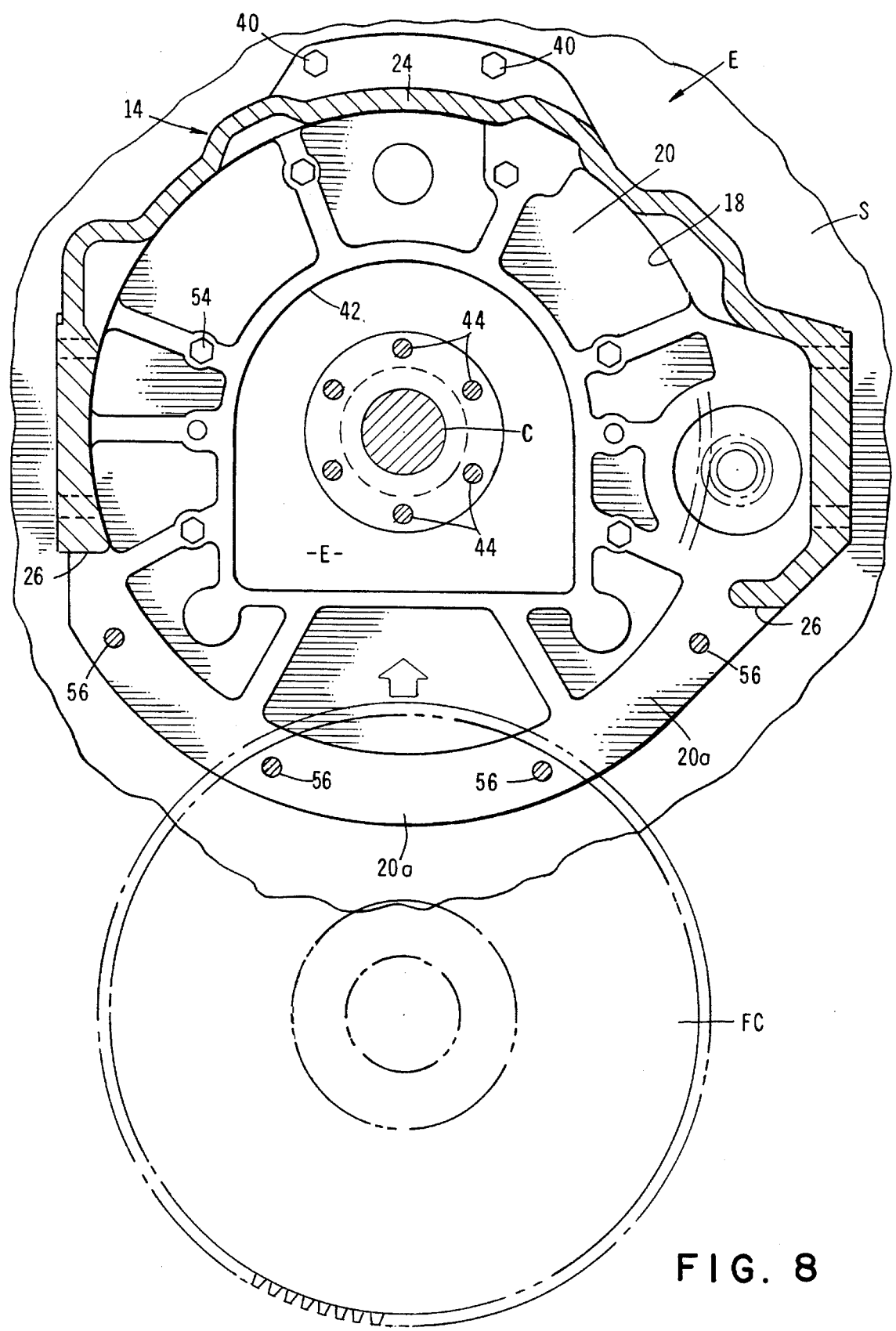
FIG. 8 is a cross-sectional view similar to FIG. 7 but showing an alternate form of the body portion of the invention wherein the adapter assembly further includes a specially configured flywheel.
Figure 9:
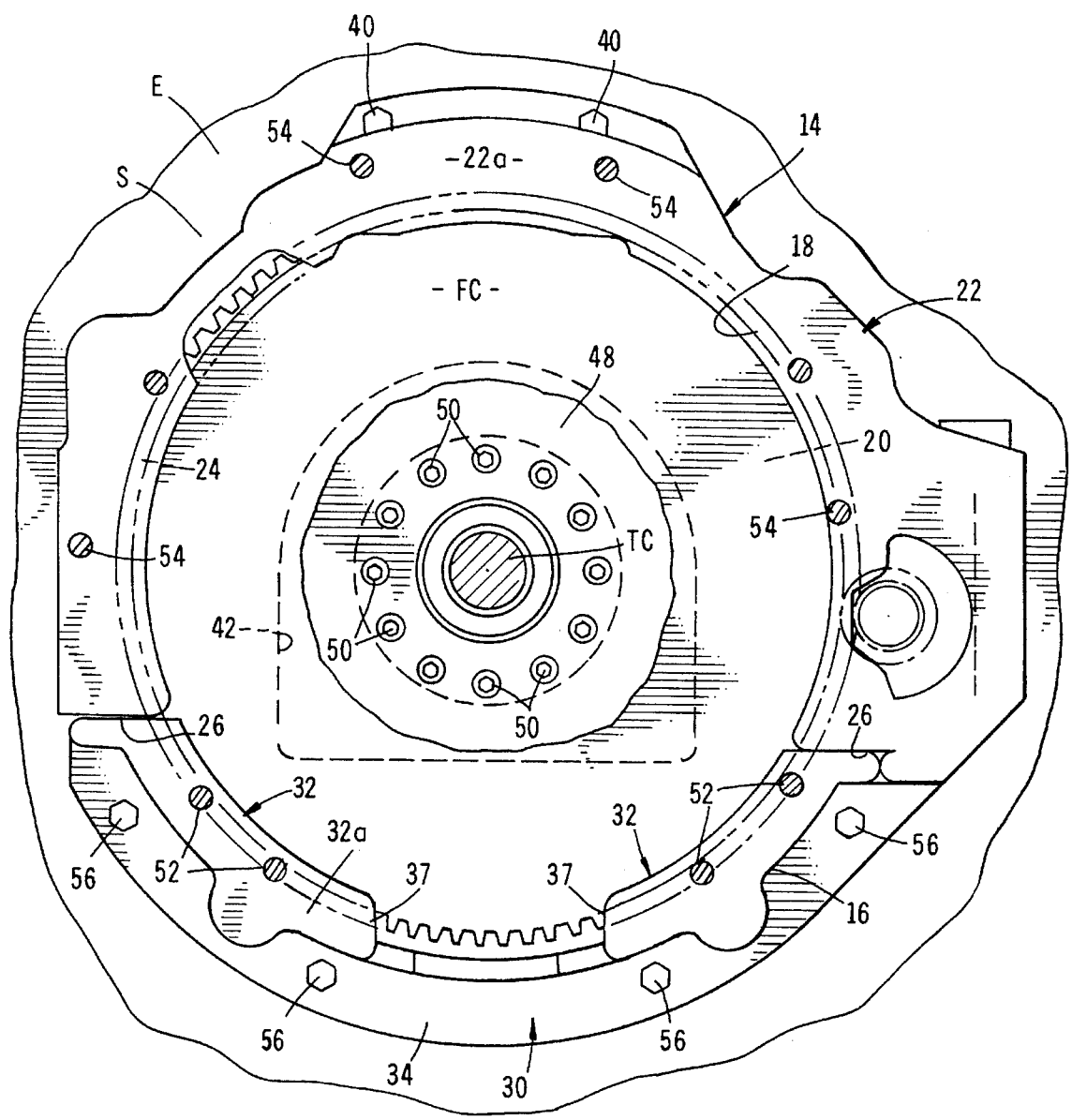
FIG. 9 is a cross-sectional view similar to FIG. 5 but showing the alternate embodiment in assembled form.

Referring now to FIGS. 8 and 9, another embodiment of the invention is there shown. This embodiment is identical in all respects to that shown in FIGS. 1 through 7 and described in the preceding paragraphs, save that the adapter assembly further includes a custom-made flywheel "FC". To avoid unnecessary duplication, like numerals are used in FIGS. 8 and 9 to identify like parts as shown in FIGS. 1 through 7.

As previously mentioned, when the adapter assembly of the invention is used to interconnect certain types of engines and transmissions, the original flywheel portion of the engine cannot be used because its configuration will not permit proper mating of the flywheel with body 14. For example, the flywheel of the engine may be too thick, or it may be of an improper diameter. In these instances a custom flywheel must be designed and constructed. This custom flywheel, which is identified in FIGS. 8 and 9 as "FC" provides the correct stack height and configuration to permit the adapter assembly, which, of necessity, now includes the custom flywheel, to be mated with body 14 and cover member 16 in the manner shown in FIG. 9. As indicated in FIG. 8, after cover 16 has been removed, the custom flywheel "FC" can be readily received within opening 26 in wall 24 and then appropriately interconnected with the engine crankshaft.

The design and construction of the custom flywheel is accomplished following a careful dimensioned study of the engine crankshaft and the body 14 which is to be used in adapting the engine to the transmission to ascertain the correct stack height of the parts and the correct outside diameter of the flywheel. Once the dimensions of the adapter body are known, one skilled in the art would have no difficulty in designing a custom flywheel "FC" of the character shown in FIGS. 8 and 9.

Having now described the invention in detail in accordance with the requirements of the patent statutes, those skilled in this art will have no difficulty in making changes and modifications in the individual parts or their relative assembly in order to meet specific requirements or conditions. Such changes and modification may be made without departing from the scope and spirit of the invention, as set forth in the following claims.

I claim:

1. An adapter assembly for interconnecting an engine and an unrelated transmission, said engine having a crankshaft, a flywheel connected to the crankshaft, a connector plate connected to the flywheel and an engaging surface, said unrelated transmission including a torque converter and a housing having an engaging surface, said adapter assembly comprising:

(a) an integral body having a chamber defined by first and second walls interconnected by a peripheral side wall, said side wall being provided with an opening to permit insertion of the flywheel of the engine into said chamber; and (b) cover means for partially covering said opening in said side wall, said cover means comprising a cover member having first and second walls interconnected by a curved wall, said curved wall having an arcuate shaped access opening provided therein for gaining access to the connector plate to enable interconnection of the connector plate with the torque converter.

2. An adapter assembly for interconnecting together an engine and an unrelated transmission wherein the engine comprises a crankshaft, a flywheel connected to the crankshaft, a connector plate connected to the flywheel and a flywheel housing having an engaging surface provided with connector bolts, and wherein the transmission includes a torque converter and a housing having an engaging surface, said adapter assembly comprising:

(a) an integrally formed body including:
      (i) a first wall having an inner surface and an outer surface interconnectable with the engaging surface of the flywheel housing of the engine;
      (ii) a second spaced apart wall having a surface interconnectable with the engaging surface of the transmission housing; and
      (iii) a circumferentially extending side wall connecting said first and second walls to define a chamber, said side wall having a circumferentially extending opening therein for receiving therethrough the flywheel of the engine;

(b) connector means disposed within said chamber of said body for connecting together the connector plate and the torque converter; and (c) cover means removably connected to said body for partially closing said circumferentially extending opening in said side wall of said body, said cover means including a curved wall having a generally arcuate shaped access opening therein to permit access to said connector means to interconnect the connector plate with the torque converter.

3. An adapter assembly as defined in claim 4 in which said cover means comprises:

(a) a first wall connected to said curved wall, said first wall having an engaging surface adapted to engage said inner surface of said first wall of said body; and (b) a second wall connected to said curved wall, said second wall having an engaging surface adapted to engage said engaging surface of said transmission housing.

4. An adapter assembly as defined in claim 3 in which said connector means for connecting together the connector plate and the torque converter comprise bolts accessible through said opening provided in said curved wall of said cover means.

5. An adapter assembly for interconnecting together an engine and an unrelated transmission wherein the engine comprises a crankshaft, a flywheel connected to the crankshaft, a connector plate connected to the flywheel and a flywheel housing having an engaging surface provided with connector bolts, and wherein the transmission includes a torque converter and a housing having an engaging surface, said adapter assembly comprising:

(a) single piece body including:
      (i) a first wall having an inner surface and an outer surface interconnectable with the engaging surface of the flywheel housing of the engine;
      (ii) a second spaced apart wall having a surface interconnectable with the engaging surface of the transmission housing; and
      (iii) a circumferentially extending side wall connecting said first and second walls to define a chamber, said side wall having a circumferentially extending opening therein for receiving therethrough the flywheel of the engine; and (b) cover means removably connected to said body for partially closing said circumferentially extending opening in said side wall of said body, said cover means comprising a closure member having:
      (i) a first wall having an engaging surface adapted to engage said inner surface of said first wall of said body;

(ii) a second wall having an engaging surface adapted to engage said engaging surface of said transmission housing; and (iii) a curved wall interconnecting said first and second walls of said closure member, said curved wall having an access opening therein to permit access to said corrector plate.

6. An adapter assembly as defined in claim 5 further including means disposed within said chamber for connecting together the connector plate and the torque converter.

7. An adapter assembly as defined in claim 5 in which said closure member is generally "Z" shaped in cross-section.

* * * * *